United States Patent
O'Meallie et al.

(10) Patent No.: US 11,273,925 B1
(45) Date of Patent: Mar. 15, 2022

(54) THERMAL MANAGEMENT SYSTEM AND METHOD FOR COOLING A HYBRID ELECTRIC AIRCRAFT PROPULSION SYSTEM

(71) Applicant: Rolls-Royce North American Technologies Inc., Indianapolis, IN (US)

(72) Inventors: Paul O'Meallie, Brownsburg, IN (US); Daniel G. Edwards, Brownsburg, IN (US); Douglas J. Snyder, Carmel, IN (US)

(73) Assignee: ROLLS-ROYCE NORTH AMERICAN TECHNOLOGIES INC., Indianapolis, IN (US)

( * ) Notice: Subject to any disclaimer, the term of this patent is extended or adjusted under 35 U.S.C. 154(b) by 0 days.

(21) Appl. No.: 17/070,006

(22) Filed: Oct. 14, 2020

(51) Int. Cl.
| | |
|---|---|
| F28D 15/02 | (2006.01) |
| F28D 15/06 | (2006.01) |
| B64D 33/08 | (2006.01) |
| F02C 6/20 | (2006.01) |
| F02C 7/12 | (2006.01) |
| H02K 9/20 | (2006.01) |
| H02K 9/26 | (2006.01) |

(Continued)

(52) U.S. Cl.
CPC .............. *B64D 33/08* (2013.01); *B64D 27/24* (2013.01); *F02C 6/20* (2013.01); *F02C 7/12* (2013.01);

(Continued)

(58) Field of Classification Search
CPC .......... F25B 5/02; F25B 5/04; F28D 15/0266; F01D 25/125; F02C 7/14; F02C 7/16; F02C 7/18; F02C 7/185
See application file for complete search history.

(56) References Cited

U.S. PATENT DOCUMENTS 4,136,528 A    1/1979   Vogel et al.
4,470,450 A *  9/1984   Bizzell .................. F28D 15/043
                                                          165/104.25

(Continued)

FOREIGN PATENT DOCUMENTS

EP          1610077      12/2005
WO        2009039057     3/2009

OTHER PUBLICATIONS

Liang et al., "Pool boiling critical heat flux (CHF)—Part 1: Review of mechanisms, models, and correlations," *International Journal of Heat and Mass Transfer*, vol. 117, 2018, pp. 1352-1367 (Abstract only).

*Primary Examiner* — Todd E Manahan
*Assistant Examiner* — Thuyhang N Nguyen
(74) *Attorney, Agent, or Firm* — Crowell & Moring LLP

(57) ABSTRACT

A method for cooling a hybrid electric aircraft propulsion system comprises transporting a coolant through a two-phase pumped loop (TPPL) in thermal contact with an electrical machine and a plurality of power modules to be cooled, where the TPPL includes: a parallel arrangement of cold plates; an evaporator; a condenser; a first control valve; a liquid receiver; and a pump. A sensor positioned upstream of the cold plates, and in some cases upstream of the liquid receiver, measures pressure and/or temperature of a return stream of the coolant and transmits measurement data to a first controller electrically connected to the first control valve. The first controller regulates flow of a first liquid stream through the first control valve based on the pressure and/or temperature measured by the sensor, thereby keeping the return stream at a temperature within a predetermined temperature range.

20 Claims, 3 Drawing Sheets

(51) Int. Cl.
  *H02K 11/25* (2016.01)
  *H02K 11/33* (2016.01)
  *B64D 27/24* (2006.01)
  *B64D 27/02* (2006.01)

(52) U.S. Cl.
  CPC ....... *F28D 15/025* (2013.01); *F28D 15/0258* (2013.01); *F28D 15/0266* (2013.01); *F28D 15/06* (2013.01); *H02K 9/20* (2013.01); *H02K 9/26* (2013.01); *H02K 11/25* (2016.01); *H02K 11/33* (2016.01); *B64D 2027/026* (2013.01); *F05D 2220/323* (2013.01); *F05D 2220/70* (2013.01); *F05D 2270/301* (2013.01); *F05D 2270/303* (2013.01)

(56) References Cited

U.S. PATENT DOCUMENTS

| | | |
|---|---|---|
| 4,484,452 A | 11/1984 | Houser, Jr. |
| 4,566,288 A | 1/1986 | O'Neal |
| 5,103,897 A | 4/1992 | Cullimore et al. |
| 5,189,885 A | 3/1993 | Ni |
| 5,651,263 A | 7/1997 | Nonaka et al. |
| 6,161,394 A | 12/2000 | Alsenz |
| 6,948,556 B1 | 9/2005 | Anderson et al. |
| 8,490,418 B2 * | 7/2013 | Weber .................. F28D 15/0266 62/115 |
| 8,499,822 B2 * | 8/2013 | Bulin ...................... F02C 7/224 165/51 |
| 10,752,374 B1 * | 8/2020 | Lui ........................ B64D 37/34 |
| 10,962,304 B2 * | 3/2021 | Adamson ................ F25B 43/00 |
| 2004/0237546 A1 | 12/2004 | Butsch |
| 2011/0001013 A1 | 1/2011 | Torres Sepulveda et al. |
| 2011/0056225 A1 | 3/2011 | Campbell et al. |
| 2012/0324933 A1 * | 12/2012 | Louvar ............. H05K 7/20327 62/196.4 |
| 2013/0074530 A1 | 3/2013 | Piesker et al. |
| 2014/0137581 A1 * | 5/2014 | Cho ..................... F25B 23/006 62/119 |
| 2015/0135746 A1 | 5/2015 | Louvar |
| 2016/0298883 A1 | 10/2016 | Louvar et al. |

* cited by examiner

THERMAL MANAGEMENT SYSTEM AND METHOD FOR COOLING A HYBRID ELECTRIC AIRCRAFT PROPULSION SYSTEM

TECHNICAL FIELD

This disclosure relates generally to cooling systems and more specifically to a thermal management system and method for cooling a hybrid electric aircraft propulsion system.

BACKGROUND

Hybrid electric aircraft powered by both jet fuel and electricity are under development. Electrification is a key element of hybrid electric aircraft propulsion technology. One of the biggest challenges to implementing electrification is thermal management of the power generation or electric propulsor subsystem. Generators, motors, and power converters, although very efficient, generate significant amounts of heat at the overall power levels required for propulsion applications. The ability to reject this heat load from an aircraft platform to the sink of the surrounding air is constrained by volume, weight, and drag considerations. A system-level perspective of the solution space is essential to developing a capable thermal management architecture that meets the requirements. Electric machines and power electronics for terrestrial applications (automotive, rail, heavy equipment) are commonly cooled with pumped single-phase glycol-water loops. A more efficient thermal management technology that allows for energy and/or weight savings would be beneficial for cooling applications in hybrid electric aircraft.

DRAWINGS

In order that the disclosure may be well understood, there will now be described various forms thereof, given by way of example, reference being made to the accompanying drawings, in which.

The drawings described herein are for illustration purposes only and are not intended to limit the scope of the present disclosure in any way.

DETAILED DESCRIPTION

A method and thermal management system for cooling a hybrid electric aircraft propulsion system are described in this disclosure. The method and system exploit a two-phase pumped loop (TPPL), which offers advantages over traditional single-phase cooling approaches, such as lower pumping power, isothermality and resistance to freezing at low temperatures. In contrast to single-phase cooling solutions, boiling and condensing utilizing a coolant such as R134a refrigerant reduce resistance to thermal transport at both the heat source and the heat sink. Reduced thermal resistance at the heat source translates to higher coolant temperatures relative to the heat sink (e.g., ambient air), potentially enabling smaller, lighter heat exchangers with lower drag on the aircraft.

Figure 1:
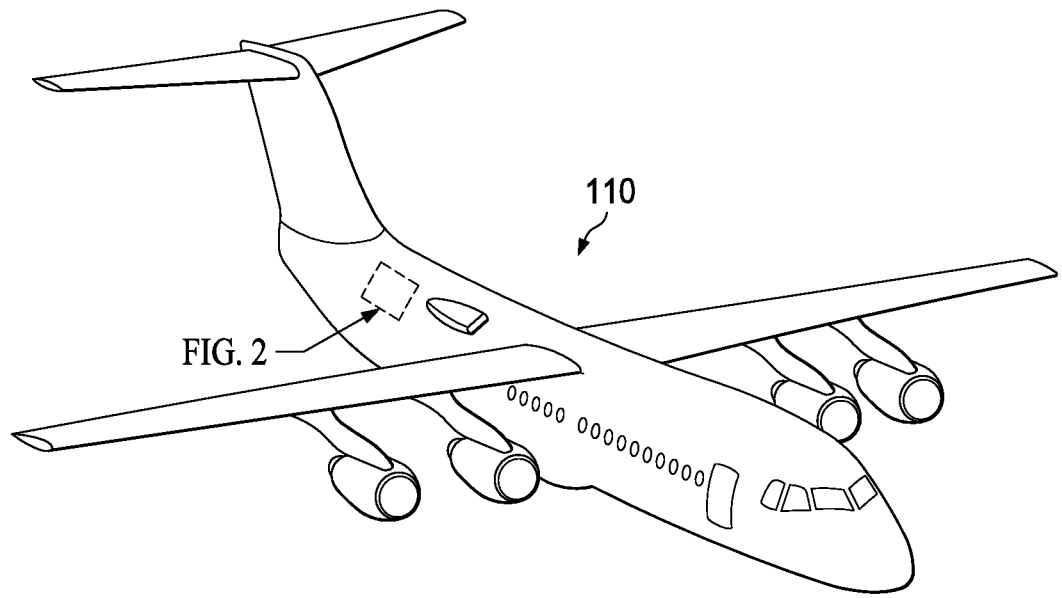
FIG. 1 is a representation of a hybrid electric aircraft which may contain the thermal management system described in this disclosure.
Figure 2:
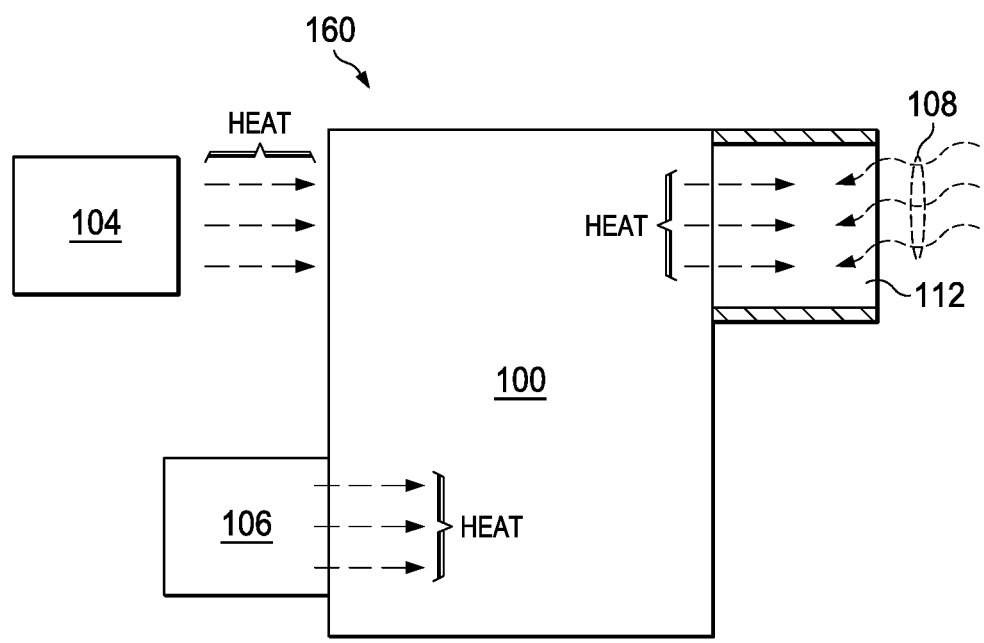
FIG. 2 is a simple schematic showing the thermal management system, which utilizes a two-phase pumped loop (TPPL) to dissipate heat from multiple heat loads, including an electrical machine, such as a generator, and multiple power modules.

The thermal management system 160 may be utilized for cooling propulsion system components on a hybrid electric aircraft 110, as shown schematically in FIG. 1. Referring to FIG. 2, the cooling method includes pumping a coolant through a TPPL 100 in thermal contact with an electrical machine 104 and power modules 106 containing electronic devices that require cooling. Heat produced by the electrical machine 104 and the power modules 106 is absorbed by the coolant in the TPPL 100 (the details of which are described below and shown in FIG. 3) and ultimately transferred to ambient air 108, which may enter the aircraft 110 via an air duct 112. The electrical machine 104 may be a generator in some examples. The method utilizes a simple control scheme, which is described below, to maintain a highly stable coolant delivery temperature despite large variations in both heat load input and ambient air conditions (e.g., temperature and air flow), depending on whether the aircraft 110 is on the ground or in flight.

Figure 3:
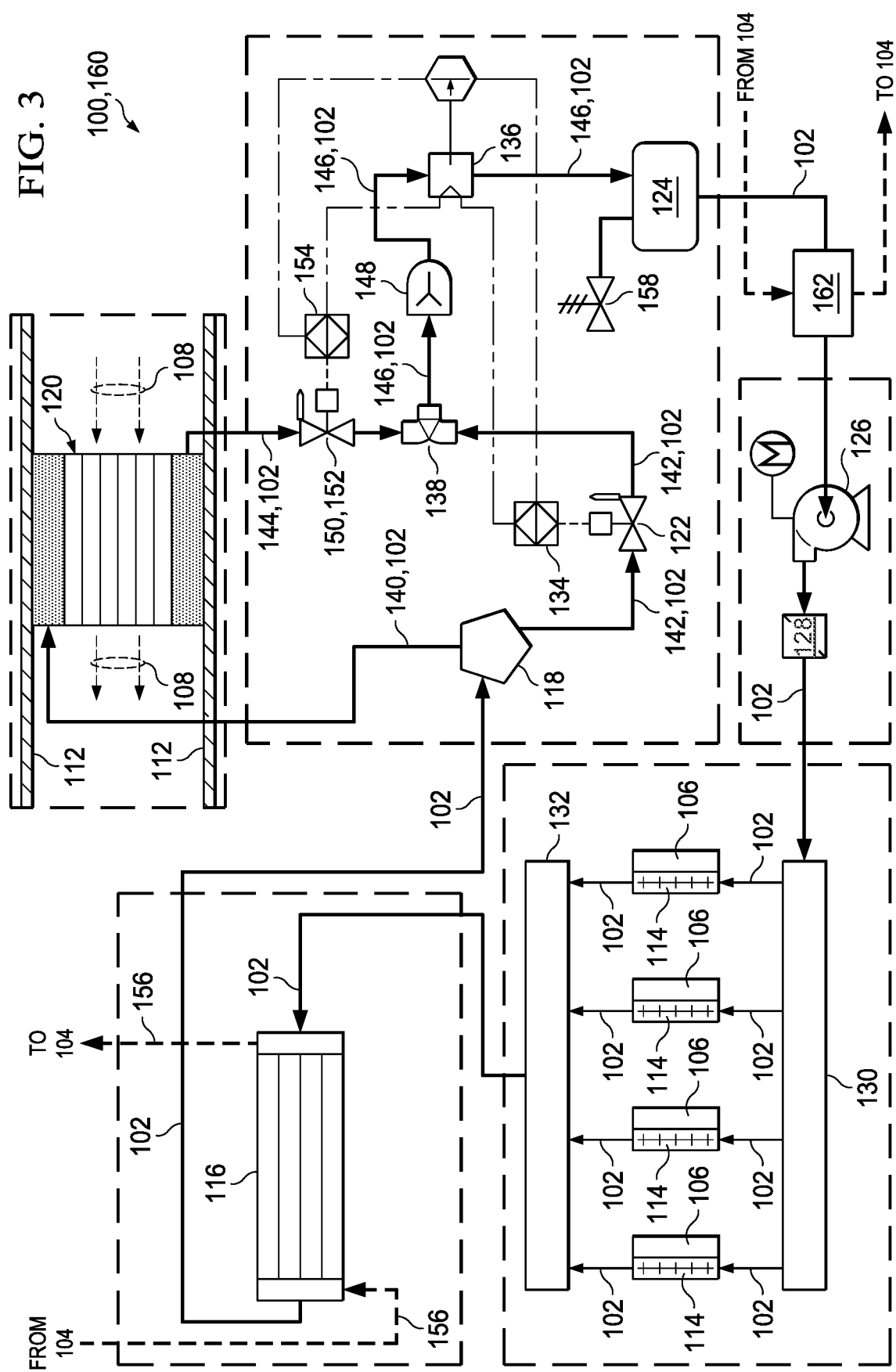
FIG. 3 shows components of the thermal management system and TPPL according to one embodiment.

Referring now to FIG. 3, the TPPL 100 may include a number of components in fluid communication with each other, including, in one example, a parallel arrangement of cold plates 114, an evaporator 116, a separator 118, a condenser 120, a first control valve 122, a liquid receiver 124, and a pump 126. The phrase "in fluid communication with" means, as used above, that the components are interconnected as known in the art, e.g., using suitable lengths of pipe or tubing and associated connectors, such that fluid (the coolant 102) can flow between and/or through the components. As indicated above, the method includes pumping a coolant 102 through the TPPL 100, which is in thermal contact with the electrical machine 104 and the power modules 106. The dotted lines surrounding components in different parts of the TPPL 100 are intended to represent possible physical groupings or modules of the components.

Referring to FIG. 3, the coolant 102 from the liquid receiver 124 is supplied to the pump 126, which delivers pressurized flow in the direction shown by the coolant arrows. The pump 126 is positioned downstream of the liquid receiver 124 and upstream of the parallel arrangement of cold plates 114. A control valve and flow meter (not shown) may be positioned downstream of the pump 126 for monitoring and adjusting the flow rate, and pump speed may also or alternatively be varied. Generally, it is preferred to operate the pump 126 at a substantially constant pump speed; that is, at a pump speed that varies less than +/−10% of a nominal value. The TPPL 100 may further include a filter dryer 128 downstream of the pump 126 to remove contaminants from the coolant 102. Also or alternatively, the TPPL 100 may include a subcooler 162 upstream of the pump 126 and downstream of the liquid receiver 124 to reduce the likelihood of cavitation as the coolant 102 flows through the pump 126.

The pressurized coolant 102 from the pump 126 reaches an entry manifold 130 where the flow is split into multiple streams. As shown in FIG. 3, the cold plates 114 are arranged in parallel such that the coolant passes through the cold plates 114 along parallel flow paths. As the multiple streams of coolant 102 flow through the parallel arrangement of cold plates 114, heat is transferred from the power modules 106 to the coolant 102, and the electronic devices are cooled. Each cold plate 114 may hold a large number of electronic devices contained within the power modules 106. The power modules/electronic devices 106 may provide power conversion, power conditioning, and/or other functions. The TPPL 100 may include any number of cold plates 114 (e.g., from two to 600) arranged in parallel, depending on the number of power modules 106 to be cooled. The cold plates 114 may include microchannels for fluid flow. Because the heat-generating power modules 106 are in direct thermal contact with the cold plates 114, the transfer of heat from the power modules 106 to the coolant 102 may be described as direct transfer of heat.

After flowing through the cold plates 114, the multiple streams of coolant 102 are merged in an exit manifold 132 positioned downstream from the cold plates 114. The coolant 102 may be described as a partially vaporized coolant after passing through the parallel arrangement of cold plates 114 and absorbing heat from the power modules 106. The vapor quality of the coolant exiting the parallel arrangement of cold plates 114 may be in a range from about 0.1 to about 0.5 and is preferably close to 0.3, where vapor quality represents the mass fraction of vapor in the coolant.

As shown in FIG. 3, the evaporator 116 is positioned downstream of the cold plates 114. The partially vaporized coolant 102 flows into and through the evaporator 116, and heat from the electrical machine 104 is transferred to the coolant 102. The heat transfer may be referred to as indirect heat transfer since the electrical machine 104 is not directly cooled by the coolant 102; instead, an intermediate fluid (e.g., heated oil) 156 from the electrical machine 104 is transported through the evaporator 116, releases heat to the coolant 102, and is returned to the electrical machine 104.

One advantage of this configuration, where the electrical machine 104 is cooled by an evaporator 116 in series with and downstream of the cold plates 114 that cool the power modules 106, is that critical heat flux can be managed and pump flow rates can be minimized. The heat loads from the power modules 106 are dissipated over a small area, which may result in large heat fluxes at the cold plate/coolant interface. If this heat flux exceeds the critical heat flux of the design, the temperature difference between the power modules 106 and the coolant 102 can become very large, resulting in early failure of the power modules 106. One way to maintain acceptable critical heat flux capability is to keep the vapor quality of the coolant 102 relatively low in the cold plates 114 (e.g., 0.1 to 0.5, preferably ~0.3). If the evaporator 116 were placed in parallel with the cold plates 114, instead of in the serial relationship shown in FIG. 3, the pump 126 would be required to supply coolant flow to the evaporator 116 in addition to the coolant flow required for the power modules 106. However, because the heat flux in the evaporator 116 is relatively low, there is little risk of exceeding critical heat flux levels in the evaporator 116. Therefore, the vapor quality of the coolant 102 exiting the evaporator 116 can be fairly high (e.g., 0.8 to 1.0) or the coolant 102 may even exit as a superheated vapor. Thus, in the configuration shown in FIG. 3, the amount of coolant flow supplied to the cold plates 114 may be sufficient to safely absorb the heat from the evaporator 116 without the need to increase coolant flow. This reduced coolant flow requirement may enable the use of a smaller pump 126 and also a reduction in coolant pumping power.

Upon exit from the evaporator 116, the coolant 102 may in some cases be described as a fully vaporized or nearly fully vaporized coolant. The coolant 102 may travel through a length of tubing to a receiver module that includes several important components and achieves several key functions. First, the coolant from the evaporator 116 may be split into a vapor stream 140 and a first liquid stream 142 in the separator 118. The separator 118 may rely on momentum and/or gravity to achieve separation, and may comprise a tee, a centrifugal separator, an inertial separator, and/or a gravity separator. In one example, separation of the coolant 102 may be achieved by a difference in momentum; higher momentum liquid flow may tend to flow through the run ("first outlet") of the separator 118 and lower momentum vapor is more likely to flow through the branch ("second outlet") of the separator 118. It is noted that the term "vapor stream" refers to a stream that predominantly, but not necessarily exclusively, comprises coolant vapor, and "liquid stream" refers to a stream that predominantly, but not necessarily exclusively, comprises coolant liquid. In other words, the vapor stream 140 may include a nonzero amount of coolant liquid, and the first liquid stream 142 or the second liquid stream referred to below may include a nonzero amount of coolant vapor.

The vapor stream 140 travels from the second outlet of the separator 118 to the condenser 120, which may be mounted in an air duct 112 fed by outside (ambient) air 108. The condenser 120 may be an air cooled tube-shell condenser. The vapor stream 140 may enter the top of the condenser 120 and flow through microtubes toward the bottom of the unit 120, as illustrated in FIG. 3. As the vapor stream 140 flows through the condenser 120, absorbed heat is transferred from the coolant vapor to the ambient air 108, and the vapor stream 140 condenses into a second liquid stream 144 of the coolant 102. Meanwhile, the first liquid stream 142 flows through the first control valve 122. A first controller 134 is electrically connected to the first control valve 122 to regulate flow through the valve 122. Under certain operating conditions, the first control valve 122 may be fully closed off such that substantially all of the coolant 102 from the evaporator 116 flows to the condenser 120. As will be discussed further below, the first controller 134 is also electrically connected to a sensor 136 configured to measure temperature and/or pressure at a location upstream of the cold plates 114; in some cases, the location may be upstream of the liquid receiver 124, as illustrated in FIG. 3. The first controller 134 and the second controller described below may utilize electrical signals and/or digital algorithms to perform receptive, comparative and corrective functions, so as to regulate flow through the respective control valve.

The first liquid stream 142 from the first control valve 122 and the second liquid stream 144 from the condenser 120 are combined into a return stream 146 of the coolant 102. The combining may take place in a tee 138 that includes a first inlet for passage of the first liquid stream 142, a second inlet for passage of the second liquid stream 144, and a single outlet for the return stream 146. The TPPL 100 may further include a mixer 148 to promote mixing of the return stream 146 prior to entering the liquid receiver 124. The mixer 148 may include passive and/or active mixing elements, that is, stationary or moving components designed to mix the return stream 146 of coolant 102 as it flows through. Passage through the mixer 148 may improve the temperature uniformity of the return stream 146.

Advantageously, the return stream 146 is delivered to the liquid receiver 124 at a temperature within a predetermined temperature range, e.g., within +/−20% of a set temperature, within +/−10% of a set temperature, or within +/−5% of a set temperature. Also or alternatively, the temperature may be within +/−20° C., within +/−10° C., or within +/−2° C. of the set temperature. This temperature control can be achieved due at least in part to the incorporation of the first control valve 122 into the TPPL in a leg parallel to the condenser 120, which allows for control over the volume of coolant 102 passing through the condenser 120 (the vapor stream 140) as well as the volume of coolant 102 bypassing the condenser 120 (the first liquid stream 142). The sensor 136 measures the pressure and/or temperature of the return stream 146 at a location downstream of the tee 138, and the measurement data are electronically transmitted to the first controller 134. Accordingly, the flow of the first liquid stream 142 through the first control valve 122 can be regulated based on the pressure and/or temperature measured by the sensor 136, thereby keeping the return stream 146 within the predetermined temperature range for entry into the liquid receiver 124 and/or for return to the parallel arrangement of cold plates 114.

This architecture enables the thermal management system to maintain a highly stable coolant delivery temperature despite large variations in both the heat load input and the ambient temperature and airflow seen by the condenser 120. Aircraft cooling applications are particularly challenging in that the ambient heat rejection temperature may change both drastically and rapidly as the aircraft 110 flies higher in the atmosphere. The ambient air 108 flowing through the condenser 120 may range from, for example, about −60° C. at high altitudes to about 50° C. during ground operations. In addition, the total airflow through the condenser 120, which is another key element in heat exchanger performance, varies greatly from ground operations to flight at high speed. The architecture described above can compensate for all of the above effects with a single control valve 122 and a simple control scheme.

In some cases, the TPPL may further include a flow restrictor or valve 150 downstream of the condenser 120 and upstream of the tee 138 to regulate flow of the second liquid stream 144 into the tee 138. For example, the valve 150 may comprise a second control valve 152 with a second controller 154 electrically connected to the sensor 136. Similar to the functioning of the first control valve 122, the second control valve 152 may regulate the flow of the second liquid stream 144 based on the temperature and/or pressure of the return stream 146 at a location downstream of the tee 138, e.g., prior to entry into the liquid receiver 124. In other examples, the valve may comprise a check valve with a cracking pressure (e.g., a minimum upstream pressure required to open the check valve sufficiently to allow detectable flow). The optional flow restrictor or valve 150 may complement the first control valve 122, which is essential to the TPPL 100.

The coolant 102 employed in the TPPL 100, which may alternatively be referred to as a refrigerant, may be any fluid that undergoes a liquid-to-vapor phase change. For example, the coolant may comprise a chlorofluorocarbon (CFC), a hydrochlorofluorocarbon (HCFC), a hydrofluorocarbon (HFC) such as R134a, difluoromethane, difluoroethane, carbon dioxide, ammonia, a water/ammonia mixture, or a combination thereof.

To summarize, a thermal management system 160 for cooling a hybrid electric aircraft propulsion system, which is illustrated in FIG. 3 and which may be employed in the method described above, may include a two-phase pumped loop (TPPL) 100 having the following components: a liquid receiver 124 for storing a coolant 102; a pump 126 downstream of the liquid receiver 124 for pumping the coolant through the TPPL; a parallel arrangement of cold plates 114 downstream of the pump 126 for transferring heat from a plurality of power modules 106 to the coolant; an evaporator 116 downstream of the cold plates 114 for transferring heat from an electrical machine 104 (or more specifically, from an intermediate fluid (such as oil) from the electrical machine 104) to the coolant 102; a separator 118 downstream of the evaporator 116 for separating or splitting the coolant 102 into a vapor stream 140 and a first liquid stream 142; a condenser 120 downstream of a first outlet of the separator 118 for condensing the vapor stream 140 into a second liquid stream 144 and releasing absorbed heat to the ambient air 108; a first control valve 122 downstream of a second outlet of the separator 118 for regulating flow of the first liquid stream 142; and a tee 138 for combining the first and second liquid streams 142,144 into a return stream 146 of coolant 102 for transport to the liquid receiver 124, where the tee 138 comprises a first inlet downstream of the first control valve 122 and a second inlet downstream of the condenser 120.

The thermal management system 160 may further include a sensor 136 positioned downstream of the tee 138 and upstream of the cold plates 114 for measuring pressure and/or temperature of the return stream 146, and a first controller 134 electrically connected with the sensor 136 and configured to regulate flow of the first liquid stream 142 based on the pressure and/or temperature measured by the sensor 136. As illustrated, in some cases the sensor 136 may be positioned upstream of the liquid receiver 124. Consequently, the return stream 146 of the coolant 102 may be maintained at a temperature within a predetermined temperature range for entry into the liquid receiver 124 and/or for return to the cold plates 114.

As indicated above, the TPPL 100 may further include a mixer 148 to promote mixing and increase the uniformity of the return stream 146 prior to entering the liquid receiver 124. The TPPL 100 may also or alternatively include a flow restrictor or valve 150 (e.g., a check valve or control valve) downstream of the condenser 120 and upstream of the tee 138 to regulate flow of the second liquid stream 144. When the valve 150 is a second control valve 152, the thermal management system may further include a second controller 154 electrically connected to the sensor 136 and the valve 152 to regulate the flow of the second liquid stream 144 based on the temperature and/or pressure measured by the sensor 136, thereby helping to maintain the desired temperature of the return stream 146 of the coolant 102. The liquid receiver 124 may take the form of a vessel in which gravity causes liquid to settle to a bottom portion of the vessel and vapor to rise to a top portion of the vessel; accordingly, the liquid receiver may include a relief valve 158 to control and relieve pressure. The TPPL 100 may also or alternatively include a subcooler 162 downstream of the liquid receiver 124 and upstream of the pump 126, as mentioned above, to reduce the likelihood of cavitation as the coolant 102 from the liquid receiver 124 flows through the pump 126. As indicated by the dotted line into and out of the subcooler 162, a flow of water or another cooling fluid may be cycled through the subcooler 162.

While the method and thermal management system 160 described herein in are ideally suited for cooling a propulsion system onboard a hybrid electric aircraft, it is recognized that the method and thermal management system may be employed for cooling other types of systems and devices.

Example

Figure 4:
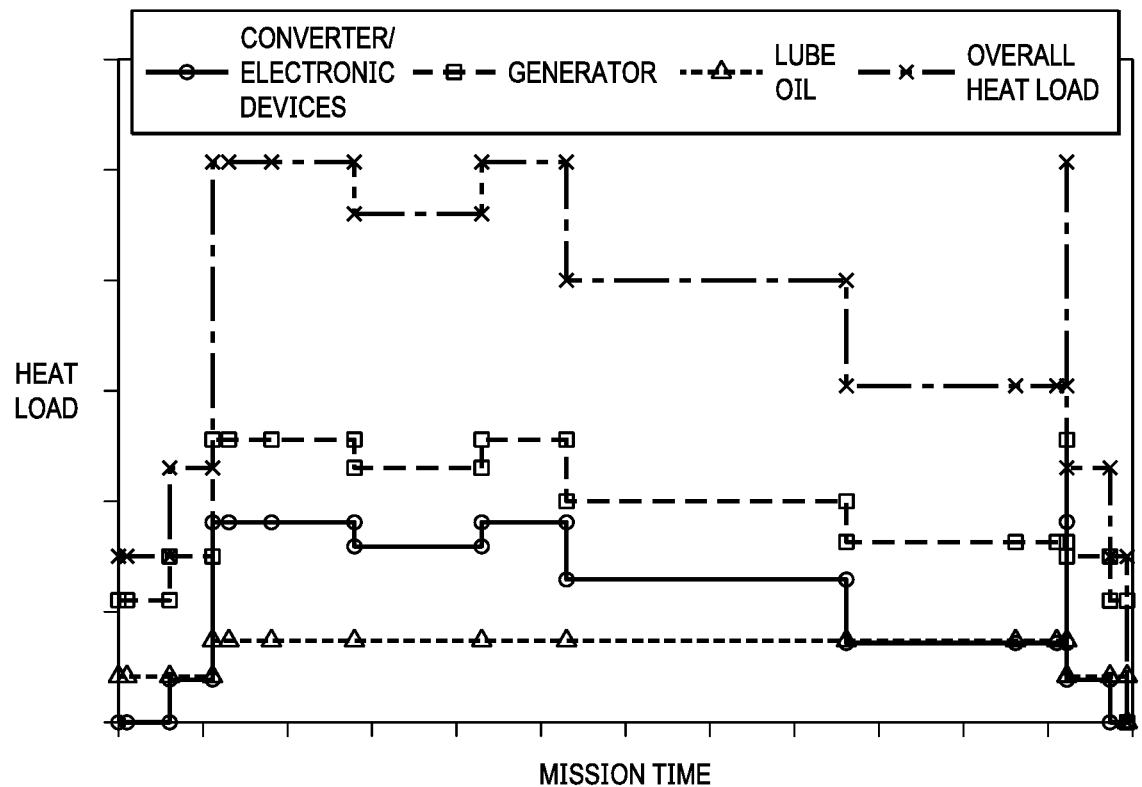
FIG. 4 shows a notional mission profile created to evaluate the TPPL during a test mission.
Figure 5:
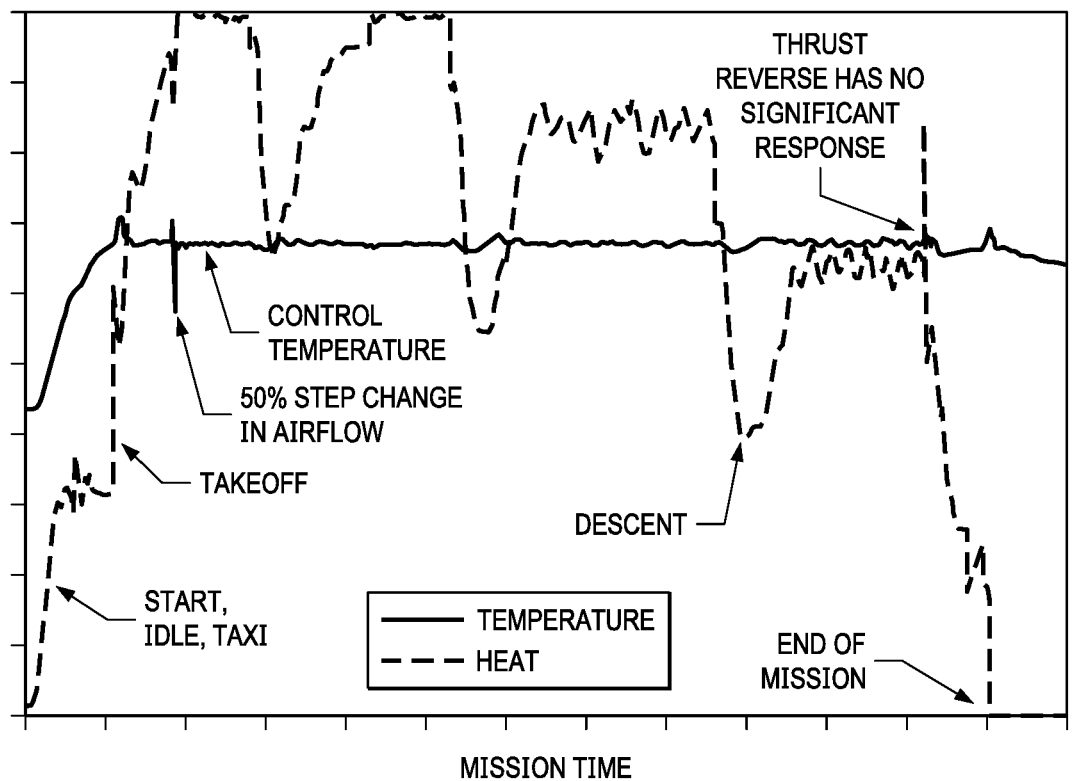
FIG. 5 shows temperature (° C.) and heat load (kW) as a function of time during the test mission.

Focused testing was carried out to evaluate the performance of the thermal management system 160. In one test of the capability of the TPPL 100, a notional mission profile was created to schedule varying levels of heat loads into the TPPL over a duration of the mission, as illustrated in FIG. 4. The mission profile test shown in FIG. 5 demonstrates the ability of the TPPL 100 to dissipate a range of heat loads during a simulated flight mission while maintaining the temperature of the coolant upstream of the liquid receiver to within a predetermined temperature range.

To clarify the use of and to hereby provide notice to the public, the phrases "at least one of <A>, <B>, . . . and <N>" or "at least one of <A>, <B>, . . . <N>, or combinations thereof" or "<A>, <B>, . . . and/or <N>" are defined by the Applicant in the broadest sense, superseding any other implied definitions hereinbefore or hereinafter unless expressly asserted by the Applicant to the contrary, to mean one or more elements selected from the group comprising A, B, . . . and N. In other words, the phrases mean any combination of one or more of the elements A, B, . . . or N including any one element alone or the one element in combination with one or more of the other elements which may also include, in combination, additional elements not listed. Unless otherwise indicated or the context suggests otherwise, as used herein, "a" or "an" means "at least one" or "one or more."

While various embodiments have been described, it will be apparent to those of ordinary skill in the art that many more embodiments and implementations are possible. Accordingly, the embodiments described herein are examples, not the only possible embodiments and implementations.

The subject-matter of the disclosure may also relate, among others, to the following aspects:

A first aspect relates to a method for cooling a hybrid electric aircraft propulsion system, the method comprising: transporting a coolant through a two-phase pumped loop (TPPL) in thermal contact with a electrical machine and a plurality of power modules to be cooled, the TPPL including: a parallel arrangement of cold plates; an evaporator; a condenser; a first control valve; a liquid receiver; and a pump, wherein the transporting includes: flowing the coolant through the parallel arrangement of cold plates, whereby heat is transferred from the plurality of power modules to the coolant; flowing the coolant through the evaporator, whereby heat is transferred from the electrical machine to the coolant; splitting the coolant from the evaporator into a vapor stream and a first liquid stream, the vapor stream flowing to the condenser and transferring absorbed heat to ambient air, thereby condensing into a second liquid stream, the first liquid stream flowing through the first control valve; and combining the first liquid stream and the second liquid stream into a return stream of the coolant downstream of the first control valve for delivery to the liquid receiver, wherein a sensor positioned upstream of the cold plates, and in some cases upstream of the liquid receiver, measures pressure and/or temperature of the return stream and transmits measurement data to a first controller electrically connected to the first control valve, and wherein the first controller regulates flow of the first liquid stream through the first control valve based on the pressure and/or temperature measured by the sensor, thereby keeping the return stream at a temperature within a predetermined temperature range for entry into the liquid receiver and/or return to the cold plates.

A second aspect relates to the method of the first aspect, wherein the predetermined temperature range is within +/−20% of a set temperature.

A third aspect relates to the method of the first or second aspect, wherein the evaporator is positioned downstream of the parallel arrangement of cold plates.

A fourth aspect relates to the method of any preceding aspect, wherein an intermediate fluid from the electrical machine is flowed through the evaporator and returned to the electrical machine to transfer the heat from the electrical machine to the coolant.

A fifth aspect relates to the method of any preceding aspect, wherein the plurality of power modules are in direct thermal contact with the cold plates to effect heat transfer from the plurality of power modules to the coolant.

A sixth aspect relates to the method of any preceding aspect, wherein a vapor quality of the coolant exiting the parallel arrangement of cold plates is in a range from about 0.1 to about 0.5.

A seventh aspect relates to the method of any preceding aspect, wherein a vapor quality of the coolant exiting the evaporator is in a range from about 0.8 to about 1.0.

An eighth aspect relates to the method of any preceding aspect, wherein the coolant is pumped through the TPPL at a substantially constant pump speed.

A ninth aspect relates to the method of any preceding aspect, wherein the ambient air flowing through the condenser has a widely variable temperature ranging from −60° C. at high altitudes to about 50° C. during ground operations.

A tenth aspect relates to the method of any preceding aspect, further comprising mixing the return stream in a mixer positioned upstream of the liquid receiver, thereby improving a temperature uniformity of the return stream.

An eleventh aspect relates to the method of any preceding aspect, wherein the TPPL further comprises a separator for splitting the coolant from the evaporator into the vapor stream and the first liquid stream, the separator utilizing gravity and/or momentum to effect separation.

A twelfth aspect relates to the method of any preceding aspect being carried out onboard a hybrid electric aircraft.

A thirteenth aspect relates to a thermal management system for cooling a hybrid electric aircraft propulsion system, the thermal management system comprising: a two-phase pumped loop (TPPL) comprising: a liquid receiver for storing a coolant; a pump downstream of the liquid receiver for pumping the coolant through the TPPL; a parallel arrangement of cold plates downstream of the pump for transferring heat from a plurality of power modules to the coolant; an evaporator downstream of the parallel arrangement of cold plates for transferring heat from an electrical machine to the coolant; a separator downstream of the evaporator for separating the coolant into a vapor stream and a first liquid stream; a condenser downstream of a first outlet of the separator for condensing the vapor stream into a second liquid stream; a control valve downstream of a second outlet of the separator for regulating flow of the first liquid stream; and a tee for combining the first and second liquid streams into a return stream of the coolant for transport to the liquid receiver; a sensor positioned downstream of the tee and upstream of the cold plates, and in some cases upstream of the liquid receiver, for measuring pressure and/or temperature of the return stream; and a first controller electrically connected with the sensor, the first controller being configured to regulate flow of the first liquid stream through the first control valve based on the pressure and/or temperature measured by the sensor.

A fourteenth aspect relates to the thermal management system of the thirteenth aspect, wherein the TPPL further comprises a mixer downstream of the tee to promote mixing of the return stream prior to entering the liquid receiver.

A fifteenth aspect relates to the thermal management system of the thirteenth or fourteenth aspects, wherein the TPPL further comprises a filter dryer downstream of the pump and upstream of the parallel arrangement of cold plates to remove contaminants from the coolant.

A sixteenth aspect relates to the thermal management system of any of the thirteenth through the fifteenth aspects, wherein the TPPL further comprises a valve or flow restrictor positioned downstream of the condenser and upstream of the tee to regulate flow of the second liquid stream.

A seventeenth aspect relates to the thermal management system of the sixteenth aspect, wherein the valve is a second control valve, and wherein a second controller is electrically connected to the sensor and the second control valve to regulate the flow of the second liquid stream based on the temperature and/or pressure measured by the sensor.

An eighteenth aspect relates to the thermal management system of the sixteenth aspect, wherein the valve is a check valve.

A nineteenth aspect relates to the thermal management system of any of the thirteenth through the eighteenth aspects, wherein the TPPL further comprises a subcooler downstream of the liquid receiver and upstream of the pump to reduce the likelihood of cavitation as the coolant flows through the pump.

A twentieth aspect relates to the thermal management system of any of the thirteenth through the nineteenth aspects being positioned in a hybrid electric aircraft.

In addition to the features mentioned in each of the independent aspects enumerated above, some examples may show, alone or in combination, the optional features mentioned in the dependent aspects and/or as disclosed in the description above and shown in the figures.

What is claimed is:

1. A method for cooling a hybrid electric aircraft propulsion system, the method comprising:
    transporting a coolant through a two-phase pumped loop (TPPL) in thermal contact with an electrical machine and a plurality of power modules to be cooled, the TPPL including: a parallel arrangement of cold plates; an evaporator; a condenser; a first control valve; a liquid receiver; and a pump, wherein the transporting includes:
        flowing the coolant through the parallel arrangement of cold plates, whereby heat is transferred from the plurality of power modules to the coolant;
        flowing the coolant through the evaporator, whereby heat is transferred from the electrical machine to the coolant;
        splitting the coolant from the evaporator into a vapor stream and a first liquid stream, the vapor stream flowing to the condenser and transferring absorbed heat to ambient air, thereby condensing into a second liquid stream, the first liquid stream flowing through the first control valve; and
        combining the first liquid stream and the second liquid stream into a return stream of the coolant downstream of the first control valve for delivery to the liquid receiver,
    wherein a sensor positioned upstream of the cold plates measures pressure and/or temperature of the return stream and transmits measurement data to a first controller electrically connected to the first control valve, and
    wherein the first controller regulates flow of the first liquid stream through the first control valve based on the pressure and/or temperature measured by the sensor, thereby keeping the return stream at a temperature within a predetermined temperature range.

2. The method of claim 1, wherein the predetermined temperature range is within +/−20% of a set temperature.

3. The method of claim 1, wherein the evaporator is positioned downstream of the parallel arrangement of cold plates.

4. The method of claim 1, wherein intermediate fluid from the electrical machine is flowed through the evaporator and returned to the electrical machine to transfer the heat from the electrical machine to the coolant.

5. The method of claim 1, wherein the plurality of power modules are in direct thermal contact with the cold plates to effect heat transfer from the plurality of power modules to the coolant.

6. The method of claim 1, wherein a vapor quality of the coolant exiting the parallel arrangement of cold plates is in a range from 0.1 to 0.5.

7. The method of claim 1, wherein a vapor quality of the coolant exiting the evaporator is in a range from 0.8 to 1.0.

8. The method of claim 1, wherein the coolant is pumped through the TPPL at a substantially constant flow rate.

9. The method of claim 1, wherein the ambient air flowing through the condenser has a widely variable temperature ranging from −60° C. to 50° C.

10. The method of claim 1, further comprising mixing the return stream in a mixer positioned upstream of the liquid receiver, thereby improving a temperature uniformity of the return stream.

11. The method of claim 1, wherein the TPPL further comprises a separator for splitting the coolant from the evaporator into the vapor stream and the first liquid stream, the separator utilizing gravity and/or momentum to effect separation.

12. The method of claim 1 being carried out onboard a hybrid electric aircraft.

13. A thermal management system for cooling a hybrid electric aircraft propulsion system, the thermal management system comprising:
    a two-phase pumped loop (TPPL) comprising:
        a liquid receiver for storing a coolant;
        a pump downstream of the liquid receiver for pumping the coolant through the TPPL;
        a parallel arrangement of cold plates downstream of the pump for transferring heat from a plurality of power modules to the coolant;
        an evaporator downstream of the parallel arrangement of cold plates for transferring heat from an electrical machine to the coolant;
        a separator downstream of the evaporator for separating the coolant into a vapor stream and a first liquid stream;
        a condenser downstream of a first outlet of the separator for condensing the vapor stream into a second liquid stream;
        a control valve downstream of a second outlet of the separator for regulating flow of the first liquid stream; and
        a tee for combining the first and second liquid streams into a return stream of the coolant for transport to the liquid receiver;
    a sensor positioned downstream of the tee and upstream of the cold plates for measuring pressure and/or temperature of the return stream; and
    a first controller electrically connected with the sensor, the first controller being configured to regulate flow of the first liquid stream through the first control valve based on the pressure and/or temperature measured by the sensor.

14. The thermal management system of claim 13, wherein the TPPL further comprises a mixer downstream of the tee to promote mixing of the return stream prior to entering the liquid receiver.

15. The thermal management system of claim 13, wherein the TPPL further comprises a filter dryer downstream of the pump and upstream of the parallel arrangement of cold plates to remove contaminants from the coolant.

16. The thermal management system of claim 13, wherein the TPPL further comprises a valve or flow restrictor positioned downstream of the condenser and upstream of the tee to regulate flow of the second liquid stream.

17. The thermal management system of claim 16, wherein the valve is a second control valve, and
   wherein a second controller is electrically connected to the sensor and the second control valve to regulate the flow of the second liquid stream based on the temperature and/or pressure measured by the sensor.

18. The thermal management system of claim 16, wherein the valve is a check valve.

19. The thermal management system of claim 13, wherein the TPPL further comprises a subcooler downstream of the liquid receiver and upstream of the pump to reduce the likelihood of cavitation as the coolant flows through the pump.

20. The thermal management system of claim 13 being positioned in a hybrid electric aircraft.

\* \* \* \* \*